United States Patent
Su et al.

(10) Patent No.: US 11,640,188 B2
(45) Date of Patent: May 2, 2023

(54) HINGE CAPABLE OF WIDELY EXPANDING

(71) Applicant: Sinher Technology Inc., New Taipei (TW)

(72) Inventors: Ting-Hung Su, New Taipei (TW); Yung-Chang Chiang, New Taipei (TW); Sheng-Zhen Wu, New Taipei (TW)

(73) Assignee: SINHER TECHNOLOGY INC., New Taipei (TW)

( * ) Notice: Subject to any disclaimer, the term of this patent is extended or adjusted under 35 U.S.C. 154(b) by 56 days.

(21) Appl. No.: 17/470,154

(22) Filed: Sep. 9, 2021

(65) Prior Publication Data
US 2022/0083106 A1     Mar. 17, 2022

(30) Foreign Application Priority Data

Sep. 15, 2020  (TW) ................................ 109212095

(51) Int. Cl.
*E05D 11/08* (2006.01)
*G06F 1/16* (2006.01)
*F16C 11/04* (2006.01)
*E05D 3/18* (2006.01)

(52) U.S. Cl.
CPC ............ *G06F 1/1681* (2013.01); *F16C 11/04* (2013.01); *E05D 3/18* (2013.01); *E05D 11/087* (2013.01); *E05Y 2900/606* (2013.01)

(58) Field of Classification Search
CPC ..... E05D 1/04; E05D 2001/045; F16C 11/04; G06F 1/1681
See application file for complete search history.

(56) References Cited

U.S. PATENT DOCUMENTS

| 2,233,882 | A | * | 3/1941 | Bobek | ....................... E05D 1/04 |
| | | | | | 16/348 |
| 6,317,929 | B1 | * | 11/2001 | Ring | ........................ E05D 1/04 |
| | | | | | 16/362 |
| 9,759,242 | B2 | * | 9/2017 | Hsu | ....................... F16M 13/005 |
| 9,864,415 | B2 | * | 1/2018 | Siddiqui | ............... F16M 11/10 |
| 10,037,057 | B2 | * | 7/2018 | Schafer | .............. H04M 1/0216 |

(Continued)

FOREIGN PATENT DOCUMENTS

TW     I688323 B     3/2020

*Primary Examiner* — Jason W San
(74) *Attorney, Agent, or Firm* — Muncy, Geissler, Olds & Lowe, P.C.

(57) ABSTRACT

A hinge capable of widely expanding includes an arc-shaped guide member, two movable members and two torsion generating members, wherein first guide rails are formed on two sides of the arc-shaped guide member, and a circular displacement track is defined by an arc center of the arc-shaped guide member. Each of the two movable members, respectively positioned on two sides of the arc-shaped guide member, is provided with a working surface contacting one of the first guide rails and an arc-shaped through hole penetrating therethrough. The arc center of the arc-shaped through hole is the same as the arc-shaped guide members'. Each of the two torsion generating members is assembled to the arc-shaped guide member through the arc-shaped through hole to which one of the two movable members belongs. The two movable members are guided by the arc-shaped guide member to move on the circular displacement track.

7 Claims, 9 Drawing Sheets

(56) References Cited

U.S. PATENT DOCUMENTS

| | | | |
|---|---|---|---|
| 10,168,746 B2* | 1/2019 | Senatori | G06F 1/1616 |
| 10,309,137 B2* | 6/2019 | Wu | F16C 11/04 |
| 10,358,853 B2* | 7/2019 | Tomky | F16M 11/38 |
| 10,545,540 B2* | 1/2020 | Wendt | G06F 1/1681 |
| 11,320,871 B2* | 5/2022 | Lin | E05D 11/1014 |
| 11,353,931 B2* | 6/2022 | Hsu | G06F 1/1681 |
| 2009/0320243 A1* | 12/2009 | Wang | G06F 1/1616 16/303 |
| 2011/0232035 A1* | 9/2011 | Huang | G06F 1/1681 16/386 |
| 2016/0083989 A1* | 3/2016 | Kuo | E05D 1/04 16/355 |
| 2016/0090767 A1* | 3/2016 | Park | E05D 11/1042 16/319 |
| 2017/0003719 A1* | 1/2017 | Siddiqui | G06F 1/166 |
| 2017/0068284 A1* | 3/2017 | Park | G06F 1/1679 |
| 2017/0208703 A1* | 7/2017 | Lin | H05K 7/16 |
| 2017/0269637 A1* | 9/2017 | Lin | F16C 11/04 |
| 2018/0049329 A1* | 2/2018 | Seo | G06F 1/1652 |
| 2018/0081404 A1* | 3/2018 | Schafer | G06F 1/1616 |
| 2018/0129253 A1* | 5/2018 | Siddiqui | G06F 1/1681 |
| 2019/0011957 A1* | 1/2019 | Wendt | E05D 11/082 |

* cited by examiner

HINGE CAPABLE OF WIDELY EXPANDING

FIELD OF THE INVENTION

The invention relates to a hinge capable of widely expanding, in particular to a hinge comprises a plurality of members with a same arc center, wherein the plurality of members is able to expand greatly in a circular displacement track.

BACKGROUND OF THE INVENTION

With the development of technology and the gradual improvement of users' demands, the optimal design of different types of electronic products is constantly emerging. Generally, an electronic device is provided with two bodies. The relative position of the two bodies changes based on use status. The two bodies are in open state as in use, and in closed state as not in use. A connecting structure is usually arranged between the two bodies of the electronic device, and the conversion between the two states is realized through the connecting structure. However, the converting operation between the use state and the non-use state of the electronic device is complicated due to the existing structure design, which is inconvenient for users. In addition, most of the existing hinge mechanisms of the electronic device are external structures, which not only affects the appearance of the device, but also barely limits the opening angle. Once the rotating angle is too large, the impact between the parts of the hinge causes damage in conventional hinges. As disclosed in TWI 688323 B, the published patent is mainly a double-shaft type hinge device which expands as two shafts relatively rotate. Specifically, each of the two shafts of the double-shaft type hinge device includes a center through which the double shafts respectively rotate and expand. It can be seen that the application of the double-shaft type hinge device to electronic device is more limited. For example, the double-shaft type hinge device mainly rotates and expands through the double shafts, so that the double-shaft type hinge device occupies a certain volume relative to those assembled on an electronic device, which results that the thinner design of the electronic device is unable to be provided. Therefore, the technical problem that a person skilled in the art needs to solve is that a hinge structure is unexposed after being assembled to the electronic device and maintains the function of rotating and expanding after the volume reduction arrangement.

SUMMARY OF THE INVENTION

A main object of the invention is to solve the problem that the appearance of device is influenced after the hinge is mounted.

Another object of the invention is to solve the problem that a conventional hinge must have double shafts as a rotation structure, resulting in a volume that cannot be reduced to provide a thin design of an electronic device.

In order to achieve the above objects, the invention provides a hinge capable of widely expanding. The hinge capable of widely expanding comprises an arc-shaped guide member, two movable members and two torsion generating members. A first guide rail is formed on two sides of the arc-shaped guide member, and a circular displacement track is defined by an arc center of the arc-shaped guide member. The two movable members are respectively positioned on the two sides of the arc-shaped guide member, each of the two movable members is provided with a working surface contacting one of the first guide rails and an arc-shaped through hole penetrating therethrough, and an arc center of the arc-shaped through hole is the same as the arc center of the arc-shaped guide member. The two torsion generating members are arranged on one side of each of the two movable members which does not face the first arc-shaped guide member, each of the two torsion generating members is assembled to the arc-shaped guide member through the arc-shaped through hole to which one of the two movable members belongs, and each of the two torsion generating members is provided to press one of the two movable members to bear pressure when one of the two movable members slides. The two movable members are guided by the arc-shaped guide member to move on the circular displacement track.

In one embodiment, each of the two sides of the arc-shaped guide member comprises a boss formed on both sides as the first guide rail, and the arc-shaped guide member comprises a plurality of oil grooves formed in portions where the boss is not formed.

In one embodiment, each of the two movable members comprises a guide groove formed in the working surface and cooperating with the boss, and the arc-shaped through hole is positioned in the guide groove.

In one embodiment, the arc-shaped guide member is formed with two piercings for disposing the two torsion generating members.

In one embodiment, each of the two torsion generating members comprises a mounting bar attachable to the arc-shaped guide member, a spacing sheet sleeved on the mounting bar and contacting a side, not facing the arc-shaped guide member, of one of the movable members, a plurality of elastic sheets sleeved on the mounting bar and superposed on the spacing sheet, and a pressing block arranged on the mounting bar and used for limiting the plurality of elastic sheets together with the spacing sheet.

In one embodiment, the arc-shaped guide member is comprised of a plurality of arc-shaped members that are sequentially stacked when the hinge is in a closed state. The plurality of arc-shaped members sequentially expands and slides over the circular displacement track when the hinge is in an open state.

In one embodiment, sides adjacent to each other of the plurality of arc-shaped members are each formed with a second guide rail, and the plurality of second guide rails is in mating relationship.

Through the implementation of the invention, compared with the conventional technology, the invention comprises the following characteristics.

The invention is able to be hidden inside after being assembled with the electronic device without affecting the appearance of the electronic device. The overall size of the invention is smaller than that of a conventional double-shaft hinge device through the structural design of a single-point arc center.

DETAILED DESCRIPTION OF THE PREFERRED EMBODIMENTS

Figure 1:
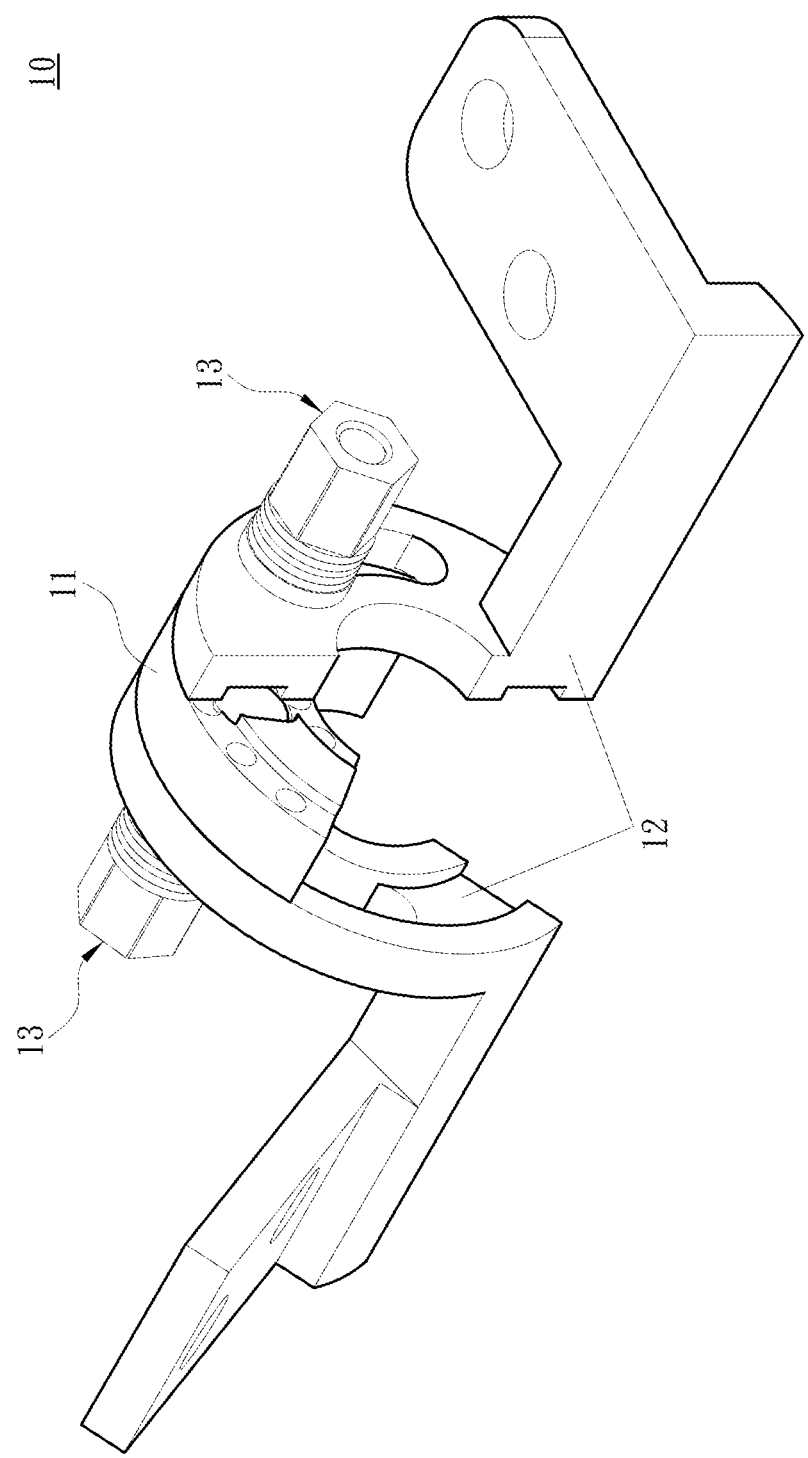
FIG. 1 is a schematic view showing the composition of three-dimensional appearance of an embodiment of the invention.

The detailed description and technical contents of the invention are described with reference to the drawings as follows:

Please refer to FIG. 1, FIG. 2, FIG. 3, FIG. 4, FIG. 5, and FIG. 6, the invention provides a hinge capable of widely expanding 10. The hinge 10 includes an arc-shaped guide member 11, two movable members 12, and two torsion generating members 13. Specifically, the arc-shaped guide member 11 is generally arc-shaped, wherein the arc-shaped guide member 11 defines a circular displacement track 111 with its arc center 30. A first guide rail along the circular displacement track 111 is formed on two sides of the arc-shaped guide member 11. The arc center of the first guide rail is the same as the arc center 30 of the circular displacement track 111. That is, the track around the first guide rail is the same as the track around the circular displacement track 111. The two movable members 12 are respectively positioned on the two sides of the arc-shaped guide member 11, each of the two movable members 12 are arc-shaped relative to the arc-shaped guide member 11. Each of the two movable members 12 are provided with a working surface 121 contacting one of the first guide rails and an arc-shaped through hole 122 penetrating therethrough. The arc center 30 of the arc-shaped through hole 122 is the same as the arc center 30 of the arc-shaped guide member 11. Specifically, a working surface 121 is formed facing the first guide rail of the two movable members 12. The working surface 121 is used for cooperating with the first guide rail so that the two movable members 12 slide relative to the first guide rail. Please refer to FIG. 1, FIG. 2, and FIG. 3, the two torsion generating members 13 are respectively arranged on a side of each of the two movable members 12 which does not face the arc-shaped guide member 11. Each of the two torsion generating member 13 is assembled to the arc-shaped guide member 11 through the arc-shaped through hole 122 to which one of the two movable members 12 belongs. Each of the two torsion generating members 13 is provided to press one of the two movable members 12 to bear pressure when one of the two movable members 12 slides.

Figure 5:
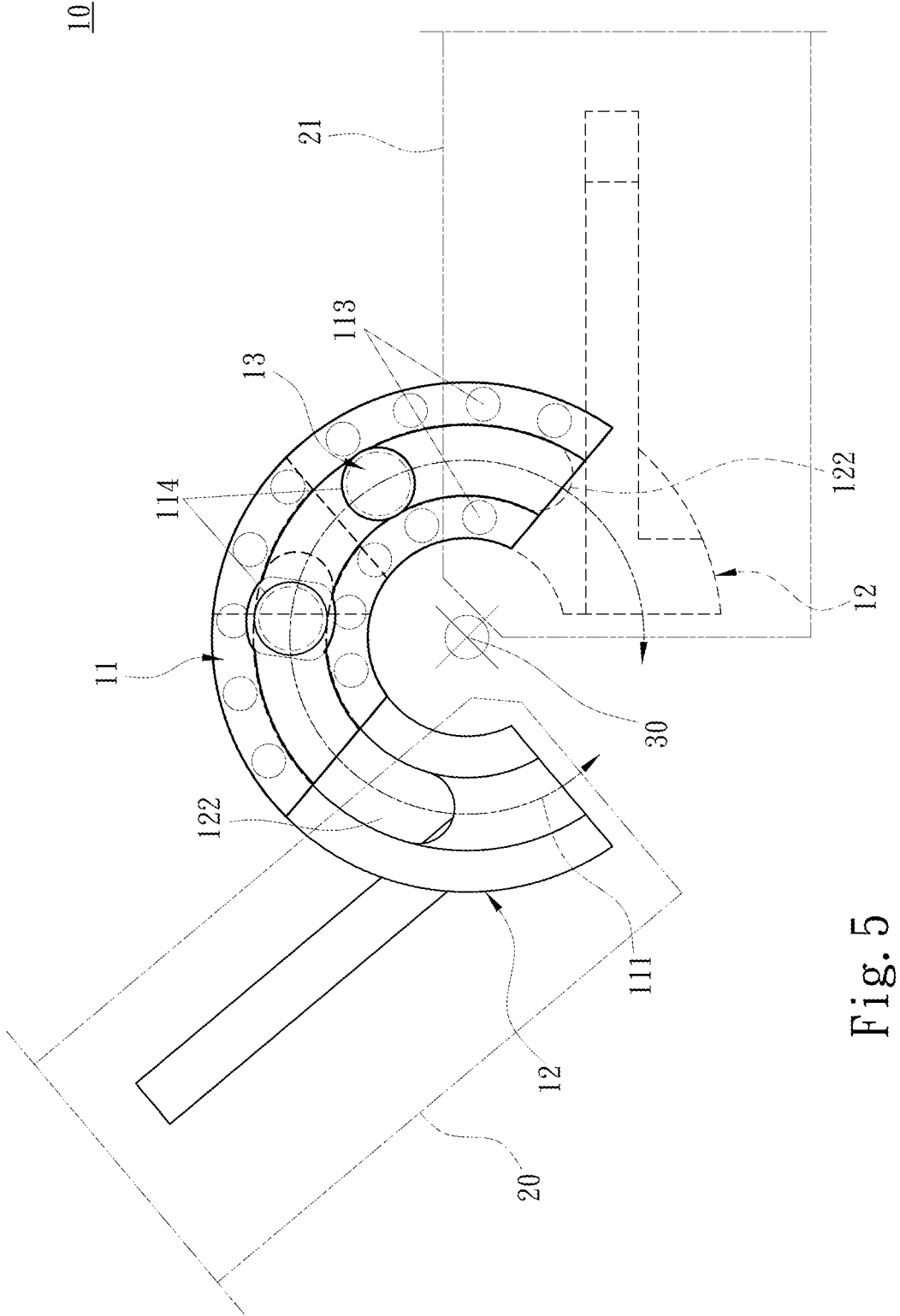
FIG. 5 is a first schematic view of actions of an embodiment of the invention.
Figure 6:
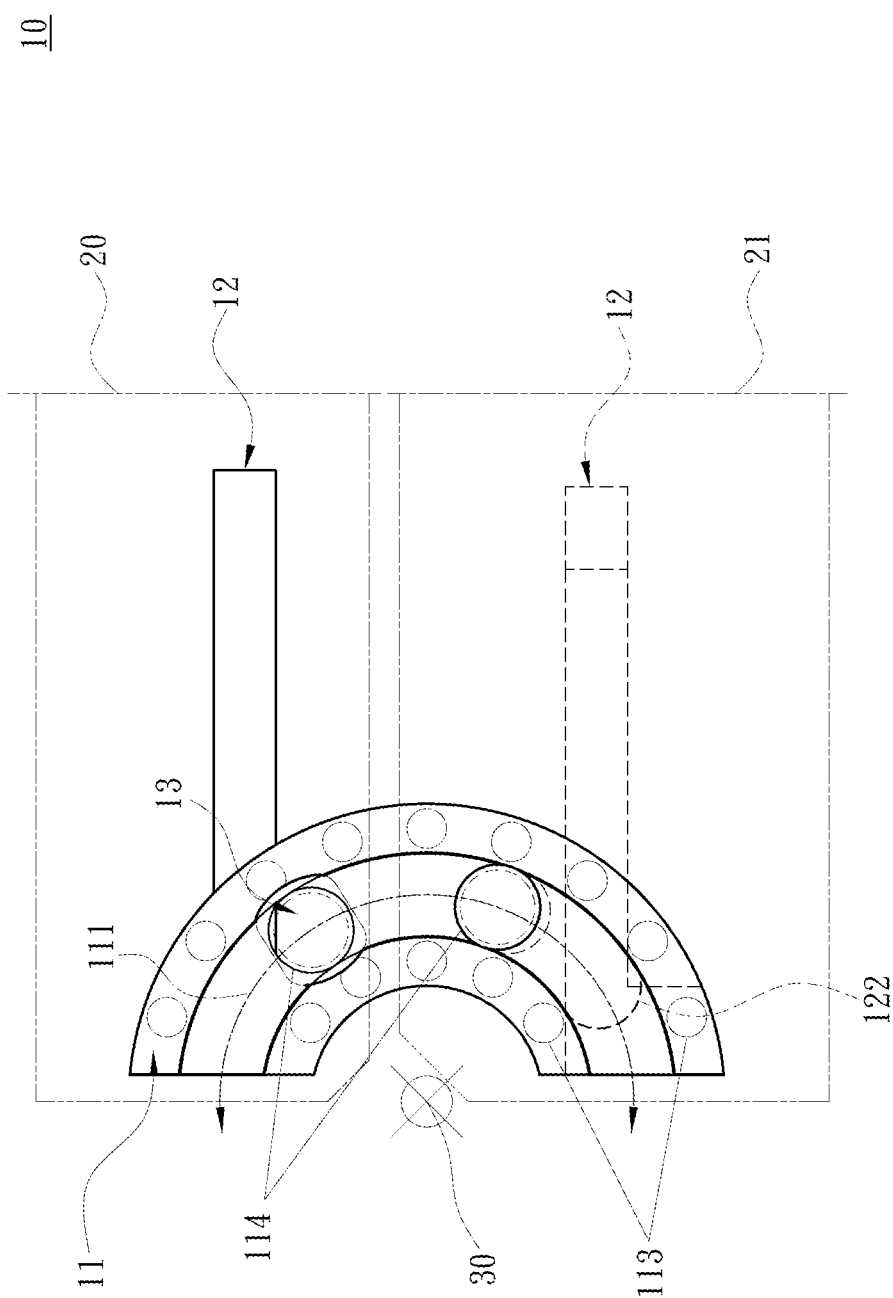
FIG. 6 is a second schematic view of actions of an embodiment of the invention.

Please refer to FIG. 2, FIG. 3, FIG. 4, FIG. 5, and FIG. 6, the implementation of the hinge 10 is described as follow. First of all, assuming that the hinge 10 is initially not operated as shown in FIG. 5, the two movable members 12 and the arc-shaped guide member 11 are arranged in expanding status with the same arc center 30. At the moment, any one of the two movable members 12 is able to be forced and pushed. The one of the two movable members 12 subjected to the force slides and approaches the other one movable member 12 along the circular displacement track 111 of the arc-shaped guide member 11. Moreover, the two movable members 12 are able to be forced simultaneously to make the two movable members 12 approach each other. Accordingly, the following description is with reference to the manner in which the two movable members 12 described above are forced and pushed by any one of the movable members 12. Since the two movable members 12 are fixed on the arc-shaped guide member 11 through the two torsion generating members 13, and the positions of the arc centers 30 of the two movable members 12 and the arc-shaped guide member 11 are the same, the one of the two movable members 12 which is subjected to force slides, by the torsion generating member 13 moving in the arc-shaped through hole 122, along the circular displacement track 111 relative to the arc-shaped guide member 11. The one of the two movable members 12 subjected to force slides until one end of the arc-shaped through hole 122 of the movable member 12 abuts against the torsion generating member 13, which results that the one of the two movable members 12 and the arc-shaped guide member 11 are overlapped from the side view. On the other hand, when one of the two movable members 12 overlapped with the arc-shaped guide member 11 is continuously subjected to force, since one end of the arc-shaped through hole 122 of the movable member 12 abuts against the torsion generating member 13, the one of the two movable members 12 pushes the arc-shaped guide member 11 to slide relative to the other one of the two movable members 12 with the circular displacement track 111. While sliding, the arc-shaped guide member 11 slides along the arc-shaped through hole 122 of the other one of the two movable members 12 with the torsion generating member 13 provided to the movable member 12 until the torsion generating member 13 stops sliding by abutting against one end of the arc-shaped through hole 122 of the other one of the two movable member 12. From the side view of FIG. 6, the two movable members 12 and the arc-shaped guide member 11 are overlapped and closed. Therefore, when the hinge 10 of the invention is actuated, the opening angles of the two movable members 12 are limited through the arc-shaped through holes 122 formed in the two movable members 12 to meet the requirement of limiting the opening angles.

Accordingly, the invention is able to be embodied such that two of the movable members 12 are respectively connected externally with connectors 20, 21, thereby allowing the hinge 10 to be applied to, for example, a notebook computer or other electronic device having a cover structure. It is also known from FIG. 5 that when the hinge 10 is formed in a closed state, the structure of the hinge 10 is completely concealed by the electronic device. Compared with an external structure which is conventionally applied to other electronic devices, the invention has the advantage that the appearance part is not influenced after being assembled and mounted to the electronic device. The components of the invention rotationally expand by the design with the same arc center 30. Such structural design greatly reduces the volume as member assemblies, which contributes to thin design of electronic devices.

Please refer to FIG. 1, FIG. 2, FIG. 3, and FIG. 4. In one embodiment, the arc-shaped guide member 11 comprises a boss 112 formed on both sides as the first guide rail. Each of the two movable member 12 comprises a guide groove 123 formed at the working surface 121 and in cooperation with the boss 112. The arc-shaped through hole 122 is positioned in the guide groove 123. Specifically, the boss 112 is able to be snap-fitted with the guide groove 123 such that the arc-shaped guide member 11 slides with the boss 112 along the circular displacement track 111 relative to the guide groove 123 of the two movable members 12. Accordingly, in one embodiment, the arc-shaped guide member 11 is formed with a plurality of oil grooves 113 in portions, where the boss 112 is not formed, on both sides to storage oil for lubrication.

Figure 2:
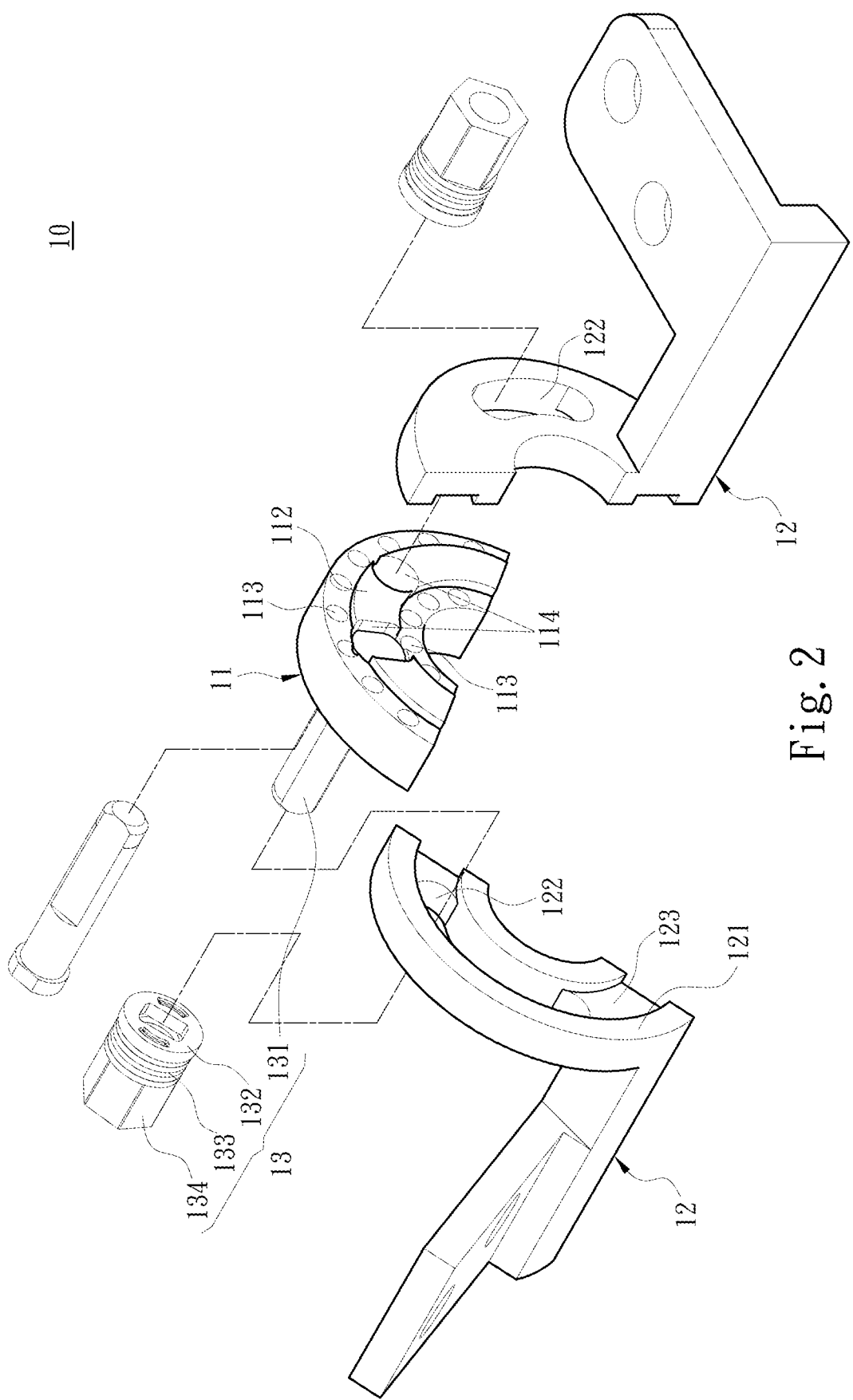
FIG. 2 is a first exploded view of members of an embodiment of the invention.
Figure 3:
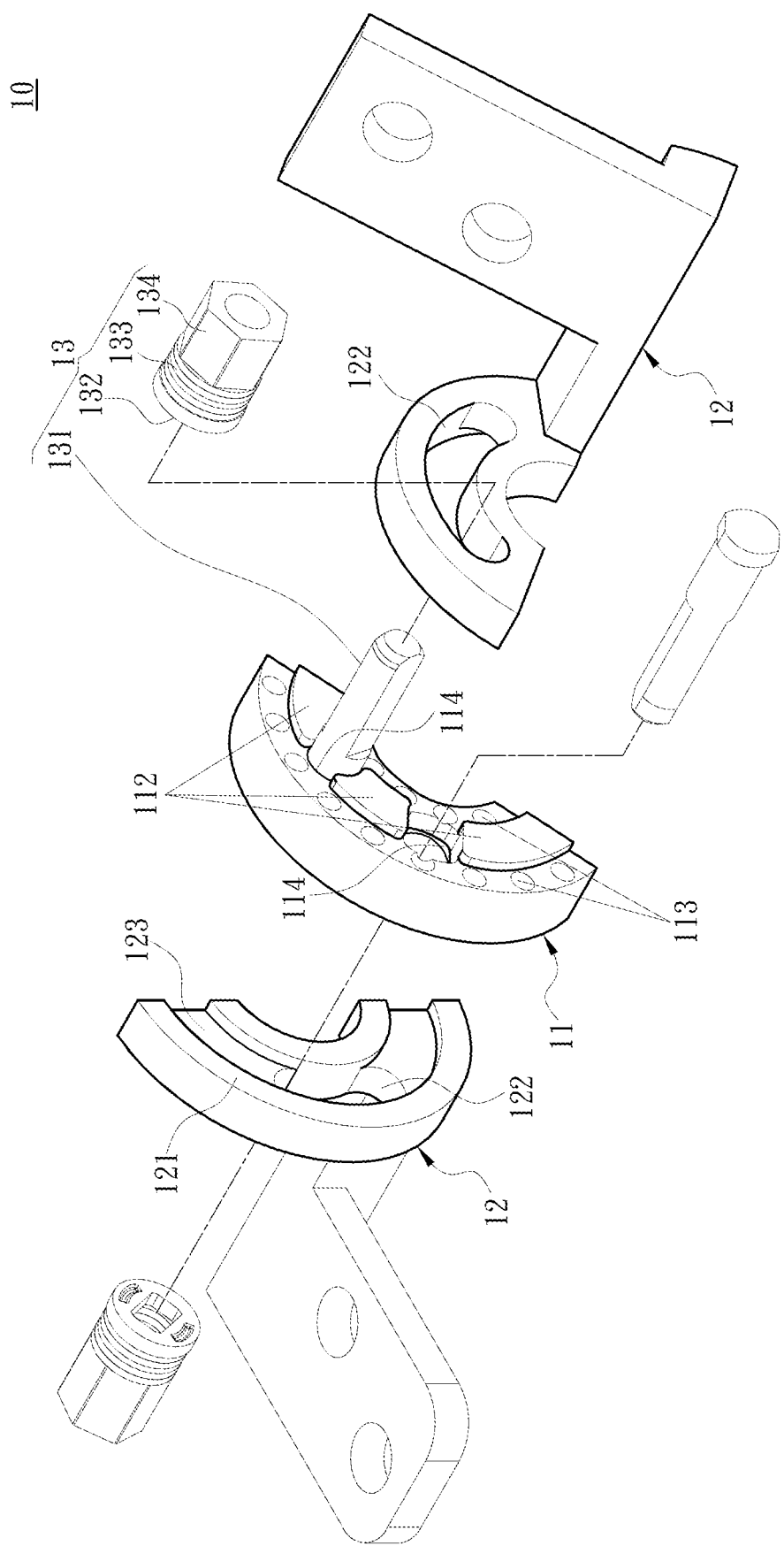
FIG. 3 is a second exploded view of members of an embodiment of the invention.
Figure 4:
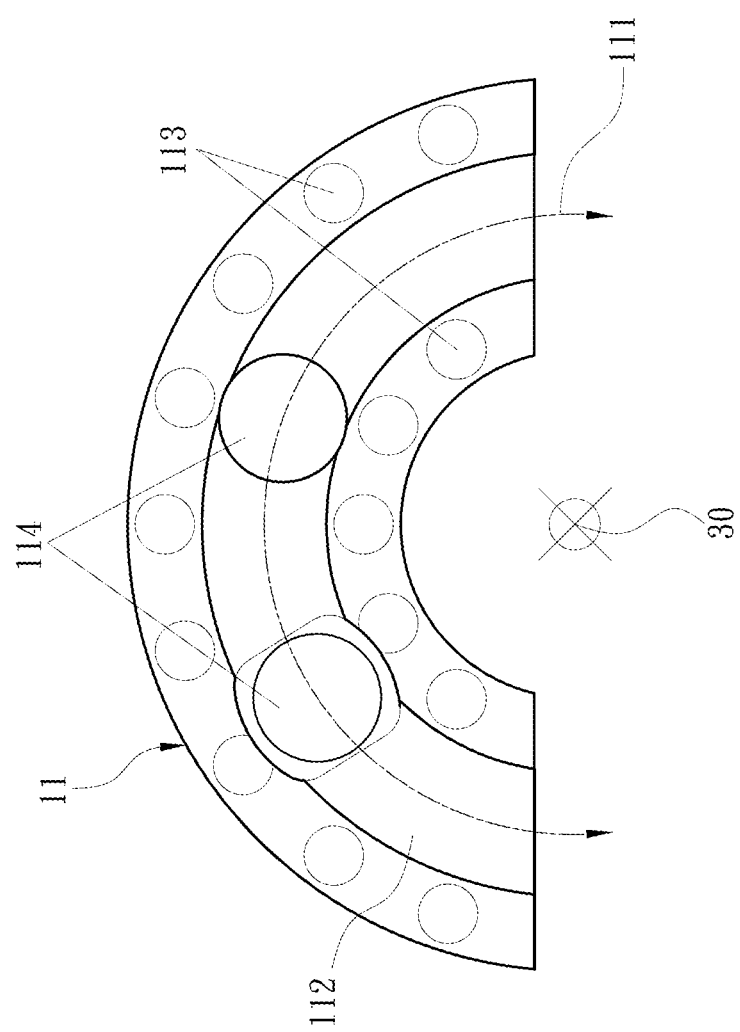
FIG. 4 is a schematic side view of an arc-shaped guide member of an embodiment of the invention.

Please refer to FIG. 2 and FIG. 3. In one embodiment, the arc-shaped guide member 11 is formed with two piercings 114 for the two torsion generating members 13 to set on. Specifically, the two torsion generating members 13 are able to be inserted through the arc-shaped through hole 122 of the two movable members 12 and then assembled with the two piercings 114 to fix the two movable members 12 to the arc-shaped guide member 11, such that the two movable members 12 stably slide with respect to the arc-shaped guide member 11. Furthermore, in one embodiment, each of the torsion generating members 13 comprises a mounting bar 131 attachable to the arc-shaped guide member 11, a spacing sheet 132 sleeved on the mounting bar 131 and contacting a side, not facing the arc-shaped guide member 11, of one of the movable members 12, a plurality of elastic sheets 133 sleeved on the mounting bar 131 and superposed on the spacing sheet 132, and a pressing block 134 arranged on the mounting bar 131 and used for limiting the plurality of elastic sheets 133 together with the spacing sheet 132.

Figure 7:
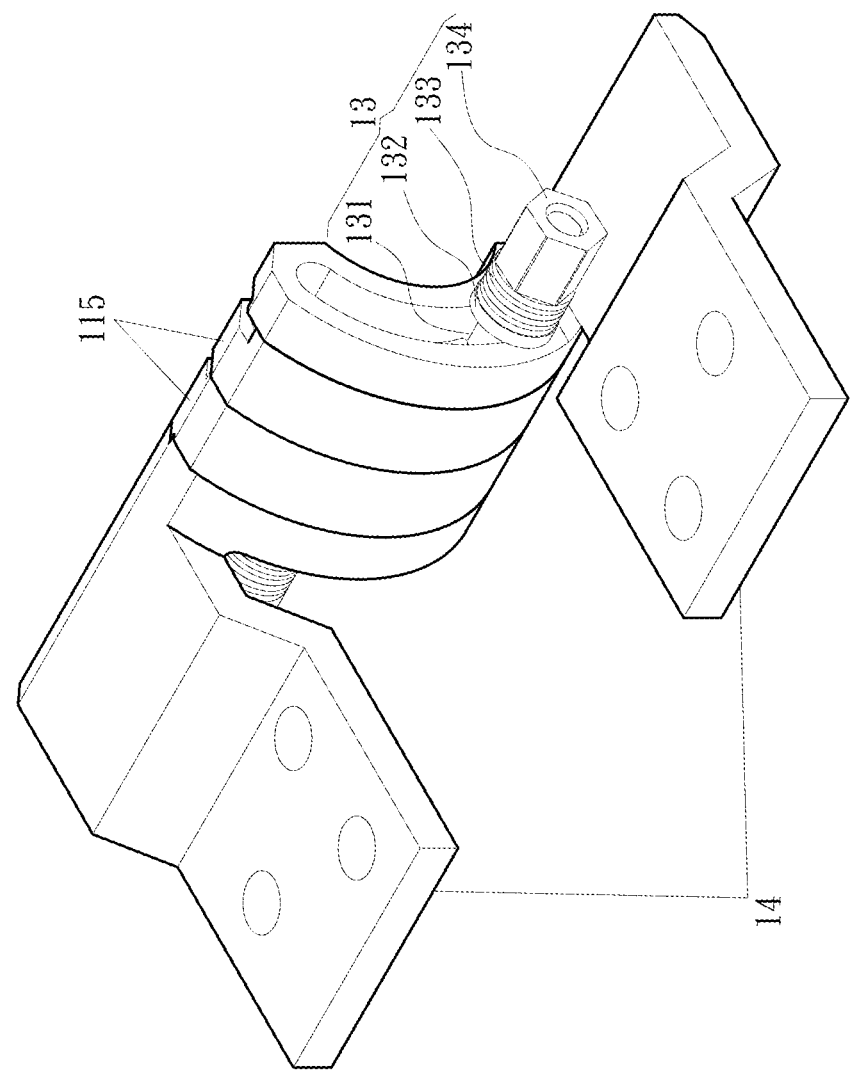
FIG. 7 is a schematic view showing the composition of three-dimensional appearance of another embodiment of the invention.
Figure 8:
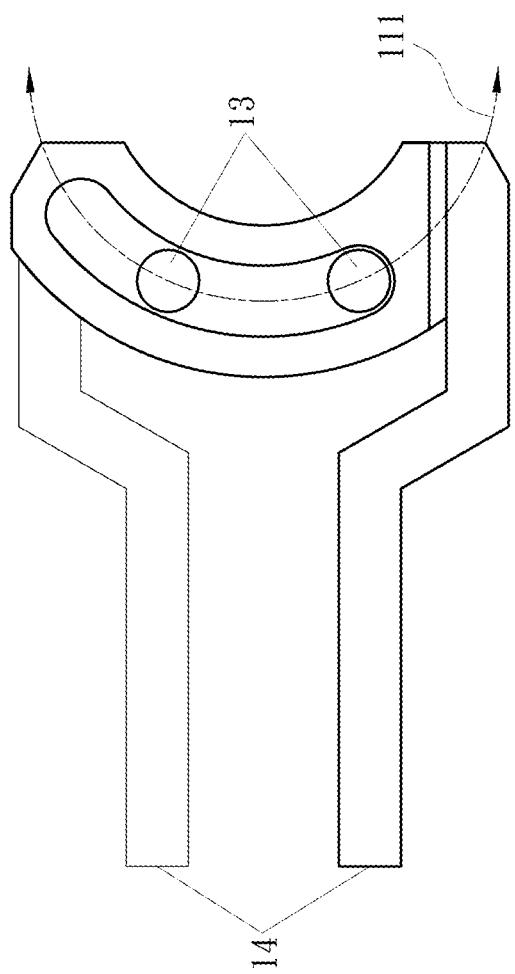
FIG. 8 is a first schematic view of another embodiment of the invention.
Figure 9:
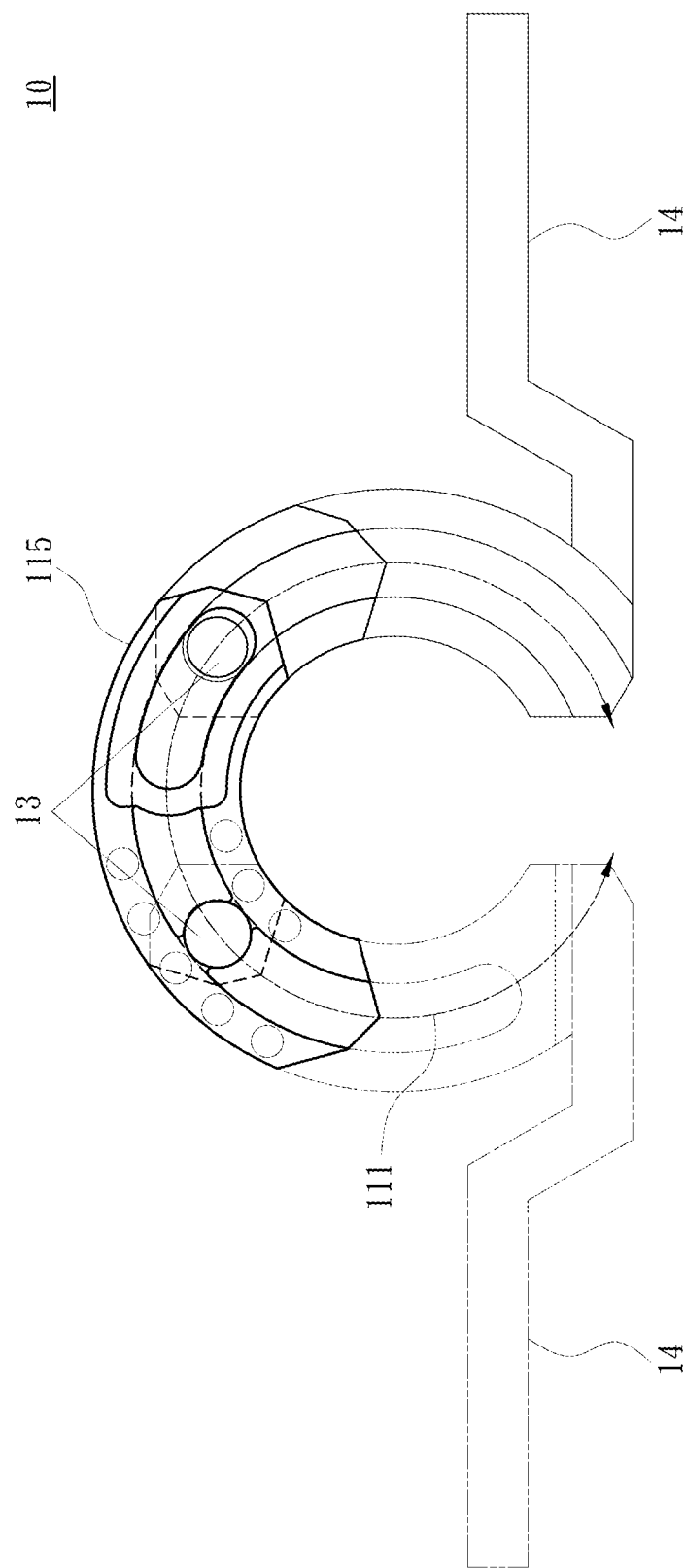
FIG. 9 is a second schematic view of another embodiment of the invention.

Please refer to FIG. 7, FIG. 8, and FIG. 9. In order to increase the opening angle of the hinge 10, in another embodiment, the arc-shaped guide member 11 (not shown in the drawings) is comprised of a plurality of arc-shaped members 115 that are sequentially stacked when the hinge 10 is in a closed state. Specifically, the hinge 10 is stacked after the two movable members 14 are engaged with the plurality of arc-shaped members 115 and the two torsion generating members 13 slide via the circular displacement track 111 so that the hinge 10 becomes the closed state. Further, the plurality of arc-shaped members 115 sequentially expands and slides on the circular displacement track 111 when the hinge 10 is in an open state. In particular, when one of the movable members 14 is pushed by a force, the movable member 14 is matched with the plurality of arc-shaped members 115 to gradually expand along the circular displacement track 111. The two movable members 14 are in cooperation with the plurality of arc-shaped members 115 to slide and expand at a larger angle, and the two movable members 14 expand horizontally with each other as shown in FIG. 9. Then, the open state is formed at a maximum opening angle of the hinge 10. Accordingly, in one embodiment, sides adjacent to each other of the plurality of arc-shaped members 115 are each formed with a second guide rail, and the plurality of second guide rails is in mating relationship. Specifically, adjacent sides of the plurality of arc-shaped members 115 that are adjacent to each other are respectively formed with the second guide rails, and the plurality of arc-shaped members 115 slides in a mating relationship with each other via the plurality of second guide rails.

What is claimed is:

1. A hinge capable of widely expanding, comprising:
    an arc-shaped guide member, each of two sides of the arc-shaped guide member opposite to each other formed with a first guide rail, and a circular displacement track being defined by an arc center of the arc-shaped guide member;
    two movable members, being respectively positioned on the two sides of the arc-shaped guide member, each of the two movable members being provided with a working surface contacting one of the first guide rails and an arc-shaped through hole penetrating therethrough, and an arc center of the arc-shaped through hole being the same as the arc center of the arc-shaped guide member; and
    two torsion generating members, respectively arranged on a side of each of the two movable members which does not face the arc-shaped guide member, each of the two torsion generating members being assembled to the arc-shaped guide member through the arc-shaped through hole to which one of the movable members belongs, and each of the two torsion generating members being provided to press one of the two movable members to bear pressure when one of the two movable members slides,
    wherein the two movable members are guided by the arc-shaped guide member to move on the circular displacement track.

2. The hinge capable of widely expanding of claim 1, wherein each of the two sides of the arc-shaped guide member comprises a boss as the first guide rail, and the arc-shaped guide member comprises a plurality of oil grooves formed in portions of the two sides where the boss is not formed.

3. The hinge capable of widely expanding of claim 2, wherein each of the two movable members comprises a guide groove formed in the working surface and cooperating with the boss, and the arc-shaped through hole is positioned in the guide groove.

4. The hinge capable of widely expanding of claim 3, wherein the arc-shaped guide member is formed with two piercings for disposing the two torsion generating members.

5. The hinge capable of widely expanding of claim 1, wherein each of the two torsion generating members comprises a mounting bar attachable to the arc-shaped guide member, a spacing sheet sleeved on the mounting bar and contacting a side, not facing the arc-shaped guide member, of one of the movable members, a plurality of elastic sheets sleeved on the mounting bar and superposed on the spacing sheet, and a pressing block arranged on the mounting bar and used for limiting the plurality of elastic sheets together with the spacing sheet.

6. The hinge capable of widely expanding of claim 5, wherein the arc-shaped guide member is comprised of a plurality of arc-shaped members, the plurality of arc-shaped members is sequentially stacked when the hinge is in a closed state, and the plurality of arc-shaped members sequentially expanding and sliding over the circular displacement track when the hinge is in an open state.

7. The hinge capable of widely expanding of claim 6, wherein sides adjacent to each other of the plurality of arc-shaped members is each formed with a second guide rail, and the plurality of second guide rails is in mating relationship.

* * * * *